UNITED STATES PATENT OFFICE.

EDWIN JAMES HUNT, OF OLDBURY, AND WILLIAM THOMAS GIDDEN, OF LANGLEY, ENGLAND, ASSIGNORS TO CHANCE AND HUNT, LIMITED, OF OLDBURY, ENGLAND.

RECOVERY OF SULFUR FROM MIXTURES CONTAINING TARRY MATTERS.

1,059,996.  Specification of Letters Patent.  Patented Apr. 29, 1913.

No Drawing.  Application filed December 30, 1912. Serial No. 739,271.

*To all whom it may concern:*

Be it known that we, EDWIN JAMES HUNT and WILLIAM THOMAS GIDDEN, subjects of the King of Great Britain, residing, respectively, at the Chemical Works, Oldbury, and at 356 Moat road, Langley, both in the county of Worcester, England, have invented a new and useful Recovery of Sulfur from Mixtures Containing Tarry Matters, of which the following is a specification.

This invention relates to an improved process for the recovery of sulfur from mixtures containing tarry matters.

According to this invention sulfur containing tarry matters is while heated to a temperature sufficient to fuse the sulfur subjected to the action of sulfuric acid whereby the tarry matters are in part dissolved and in part converted into non-tarry substances from which the sulfur can be recovered by the aid of a solvent or by distillation or by other means.

Preferably the sulfuric acid is of a specific gravity of 140° Twaddell or over and the temperature at which the treatment or agitation takes place will preferably not exceed 320° F.

The non-tarry sulfur mixture obtained may be treated with a solvent for the recovery of the sulfur either before or after separation from the acid and the acid when sufficiently contaminated with tarry matters as to be unfit for use may to a great extent be purified by dilution (which separates the tarry matters) followed by filtration.

Of the mixtures containing free sulfur and tarry matters one of the most important is spent oxid used in the purification of gas. This may first be treated with a sulfur solvent and the crude sulfur thus obtained treated as hereinbefore described or the spent oxid may be treated directly preferably after removal of a large portion of the moisture. In this case the sulfuric acid also dissolves the metallic oxids and other inorganic matter but preferably these are removed by a preliminary treatment with some suitable acid such as comparatively dilute sulfuric acid or hydrochloric acid in the cold or otherwise.

What we claim is:—

1. The process of treating a mixture containing sulfur and tarry matters which consists in heating it at least to the temperature of the melting point of sulfur and treating it with sulfuric acid.

2. The process of treating a mixture containing sulfur and tarry matters which consists in heating it at least to the temperature of the melting point of sulfur, treating it with sulfuric acid and thereafter recovering the sulfur.

3. The process of treating a mixture containing sulfur and tarry matters which consists in heating it to a temperature not exceeding 320° F. and treating it with sulfuric acid.

4. The process of treating a mixture containing sulfur and tarry matters which consists in heating it at least to the temperature of the melting point of sulfur and treating it with sulfuric acid of a specific gravity of at least 140° Twaddell.

5. The process of treating a mixture containing sulfur and tarry matters which consists in heating it at least to the temperature of the melting point of sulfur, treating it with sulfuric acid, separating the acid and then treating the residue to recover the sulfur.

6. The process of treating spent oxid used in the purification of gas which consists in first treating it with an acid which dissolves the metallic oxids in said spent oxid, then heating it at least to the temperature of the melting point of sulfur and treating it with sulfuric acid.

EDWIN JAMES HUNT.
WILLIAM THOMAS GIDDEN.

Witnesses:
HUME CHANCELLOR PINSENT,
ALFRED WILLIAM SMITH.